United States Patent [19]
Fasen

[11] Patent Number: 6,111,719
[45] Date of Patent: Aug. 29, 2000

[54] LINEAR SPEED MEASUREMENT INDEPENDENT OF LATERAL POSITION IN LINEAR TAPE SYSTEMS

[75] Inventor: Donald J. Fasen, Boise, Id.

[73] Assignee: Hewlett-Packard Company, Palo Alto, Calif.

[21] Appl. No.: 09/036,350

[22] Filed: Mar. 6, 1998

[51] Int. Cl.[7] ................................................. G11B 15/46
[52] U.S. Cl. ................................. 360/73.04; 360/77.12
[58] Field of Search ............................. 360/78.02, 73.01, 360/73.04, 73.05, 73.08, 73.09, 73.12, 77.12

[56] References Cited

U.S. PATENT DOCUMENTS

| | | | |
|---|---|---|---|
| 5,663,845 | 9/1997 | Yamamoto et al. | 360/73.14 X |
| 5,689,384 | 11/1997 | Albrecht et al. | 360/77.12 |
| 5,923,272 | 7/1999 | Albrecht et al. | 360/77.12 X |
| 5,930,065 | 7/1999 | Albrecht et al. | 360/77.12 X |
| 5,963,389 | 10/1999 | Wojciechowski et al. | 360/73.09 X |

*Primary Examiner*—Andrew L. Sniezek

[57] ABSTRACT

A linear tape system has a tape head to read and write a linear data storage tape. As the tape moves in a longitudinal direction, the tape head senses magnetic transition stripes in longitudinal servo bands to control the lateral position of the tape head relative to the tape. The system is equipped with a linear speed calculating unit that derives timing data from the servo band stripes and computes a linear speed of the data storage tape in the longitudinal direction. The linear speed calculation produces a result that is independent of the lateral position of the tape head relative to the tape.

9 Claims, 5 Drawing Sheets

LINEAR SPEED MEASUREMENT INDEPENDENT OF LATERAL POSITION IN LINEAR TAPE SYSTEMS

FIELD OF THE INVENTION

This invention relates to linear data storage tape systems and to methods of determining a linear velocity of the tape independent of the lateral position of the tape head relative to the tape.

BACKGROUND OF THE INVENTION

Because of its relatively low cost, linear tape is commonly used as a medium for storing large amounts of digital data for archival purposes. For example, disk-based memory is often archived on linear data storage tape.

Data is formatted on linear tapes in a plurality of tracks that extend longitudinally along the tape. A tape head is moveable laterally across the tape to read or write different tracks. In many cases, multiple tracks can be written or read at the same time by using a tape head with multiple read/write elements.

When reading or writing a linear data storage tape, accurate lateral positioning of the tape head is very important. To achieve such accuracy, servo bands are prewritten to the tape. The servo bands are detected by the tape head during reading and writing to determine the exact lateral position of the tape head relative to the linear tape.

To illustrate the use of servo bands, FIG. 1 shows a segment of a linear tape 10 that extends in a longitudinal direction x, and has a lateral dimension y. The tape 10 includes a plurality of servo bands 12. In the simplified example of FIG. 1, there are three servo bands. The servo bands are written to the tape during a preparatory formatting process known as "servo writing", prior to actual use of the tape for data storage. The servo bands are spaced laterally from each other by a specified distance.

Data tracks 14 are located between the servo bands 12. The lateral positions of the data tracks 14 are specified relative to the servo bands 12.

When reading or writing tape 10, a tape head senses the servo bands 12 with servo read elements and positions itself precisely relative to the servo bands. Within the tape head, data read/write elements are spaced relative to the servo read elements so that the data read/write elements will be positioned over data tracks 14 when the servo read elements are positioned accurately over the corresponding servo bands 12.

In an actual embodiment, a linear tape might have more than three servo bands. One type of tape head is configured to span two adjacent servo bands at any given time and to read or write only the data tracks between those servo bands. This type of tape head is repositioned to span two different servo bands when reading or writing other data tracks.

There are different ways to derive lateral position information from a servo band. One common way is to divide a servo band into two or more tracks, which are recorded with different information (such as distinct frequencies or bursts occurring at distinct times). A single servo head straddles the boundary between the tracks, and position information is obtained by comparing the amplitude or phase responses of the signals generated from the respective tracks.

A different approach has been described in Albrecht, et al., *Time-Based, Track-Following Servos for Linear Tape Drives*, Data Storage Magazine, 1997 (p. 41), which is hereby incorporated by reference. This approach uses a timing-based servo in which a narrow servo head reads a continuously variable servo band.

FIG. 2 shows an example of a continuously variable, timing-based servo pattern, along with a signal generated by a servo read element positioned over the servo pattern. The pattern consists of alternating magnetic transitions at two different azimuthal slopes. Relative timing of pulses generated by the read element depends on the lateral position of the head.

More specifically, the servo band illustrated in FIG. 2 has a series of magnetic transitions 20 and 22, referred to as "stripes", that are recorded on the tape with alternate azimuthal slopes. The stripes 20 have positive slope, while the intervening stripes 22 have negative slopes.

FIG. 2 shows the path and width of the servo head, indicated by reference numeral 24. The servo head reads a lateral width that is significantly less than the full lateral width of the stripes themselves. The signal generated by the servo head is represented by trace 26, illustrated directly below the illustrated magnetic transition stripes. When the servo head encounters a stripe, it generates a positive pulse. When the servo head leaves the stripe, it generates a negative pulse.

Lateral position information is derived by comparing the distances between pulses. For example, a first distance A can be defined as the distance from a positive stripe to the next negative stripe, while a second distance B can be defined as the distance from a negative stripe to the next positive stripe. When the servo head is centered over the servo band, distance A will be equal to distance B, causing consecutive pulses to occur at equal intervals. When the servo head is not centered over the servo band, distance A does not equal distance B, resulting in alternating long and short pulse intervals.

In actual implementation, alternating "bursts" of stripes are used. A burst is defined as one or more individual magnetic transition stripes.

FIG. 3 shows an example of a servo band layout utilizing alternating bursts of magnetic transition stripes. Each burst has an opposite azimuthal slope from the previous burst. The servo pattern includes repeating frames. Each frame has a first subframe A and a second subframe B. Each subframe has a pair of bursts, with the bursts of each frame having different azimuthal slopes. Subframe A has a first burst 38 with five equally spaced stripes having a positive azimuthal slope. Subframe A has a second burst 40 with five equally spaced stripes having negative azimuthal slopes. Subframe B has similar bursts 42 and 44, except each of these bursts has only four stripes rather than five.

During reading and writing, the tape is moved passed the tape head in the longitudinal direction at a specified velocity. This velocity is typically tracked by a sensor on the mechanical drive system responsible for moving the tape passed the tape head. The specified velocity is optimized to perfect conditions in which the tape head remains stationary and the tape moves precisely along a longitudinal path perpendicular to the lateral dimension of the tape. However, it is common for the tape head to move in the lateral direction across the tape as the tape is moving underneath in the longitudinal. Furthermore, the tape itself may not always pass perfectly along the longitudinal path underneath the tape head. Conventional techniques for determining linear tape speed do not account for this lateral component. As a result, the actual velocity of the tape relative to the tape head may not be the desired optimum velocity being applied by the tape drive system.

Accordingly, there is a need for a technique that determines the true linear speed of the tape beneath the tape head, independent of the head's lateral movement across the tape.

SUMMARY OF THE INVENTION

This invention concerns a system and method for determining linear speed of a data storage tape independent of lateral position of a tape head relative to the tape. The data storage tape has one or more servo bands written longitudinally down the tape, with each servo band having a longitudinal pattern of repeating frames of magnetic transition stripes. Data tracks are laid longitudinally beside the servo bands. The tape head senses the stripes in the servo bands to control its lateral position relative to the tape, thereby positioning read/write elements over the data tracks. The system is equipped with a linear speed calculating unit that derives timing data from the servo band stripes and computes a linear speed of the data storage tape in the longitudinal direction. The linear speed calculation produces a result that is independent of the lateral position of the tape head relative to the tape.

DETAILED DESCRIPTION OF THE INVENTION

Figure 4:
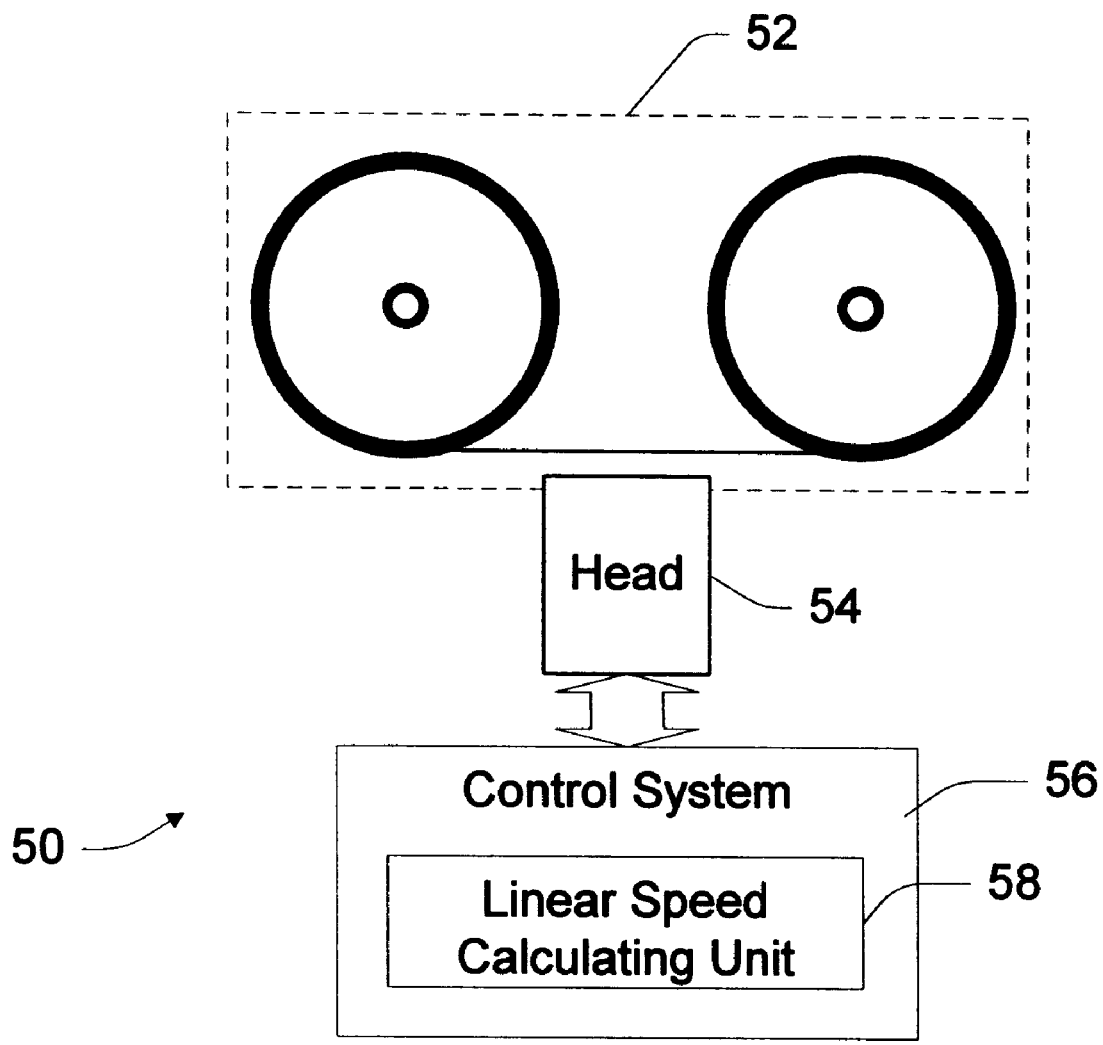
FIG. 4 is a simplified block diagram of a linear tape storage system.

FIG. 4 shows a linear storage tape system 50 that reads data from and writes data to a tape cartridge 52. The tape system 50 includes a tape read/write head 54, a drive system (not shown) that transports the tape from cartridge 52 past the tape head 54, and control electronics 56. The control electronics 56 has a linear speed calculating unit 58 to derive a linear speed of the tape from the servo band pattern laid on the tape.

Figure 1:
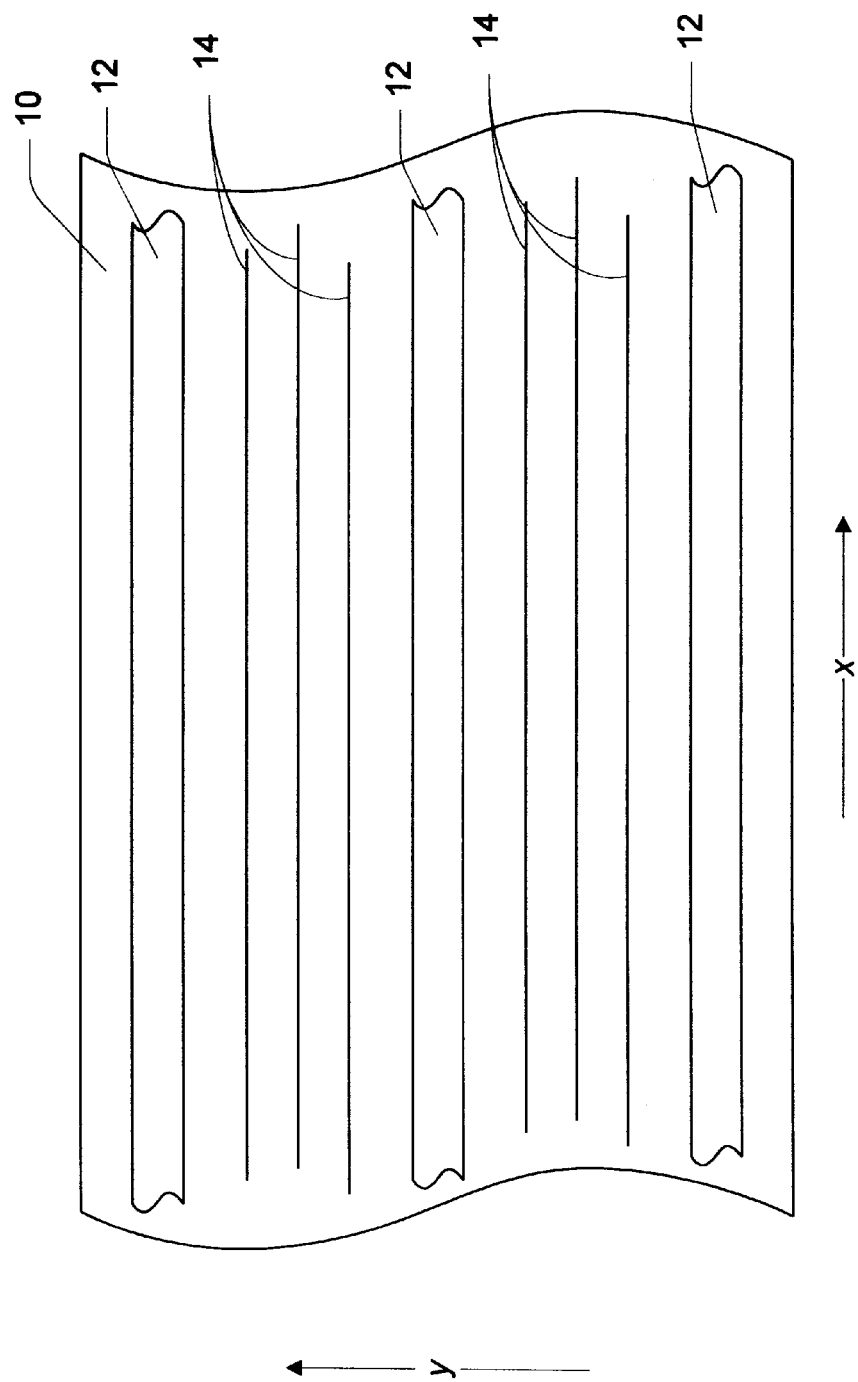
FIG. 1 shows a segment of a prior art linear tape and illustrates the layout of servo bands and data tracks on the linear tape.
Figure 2:
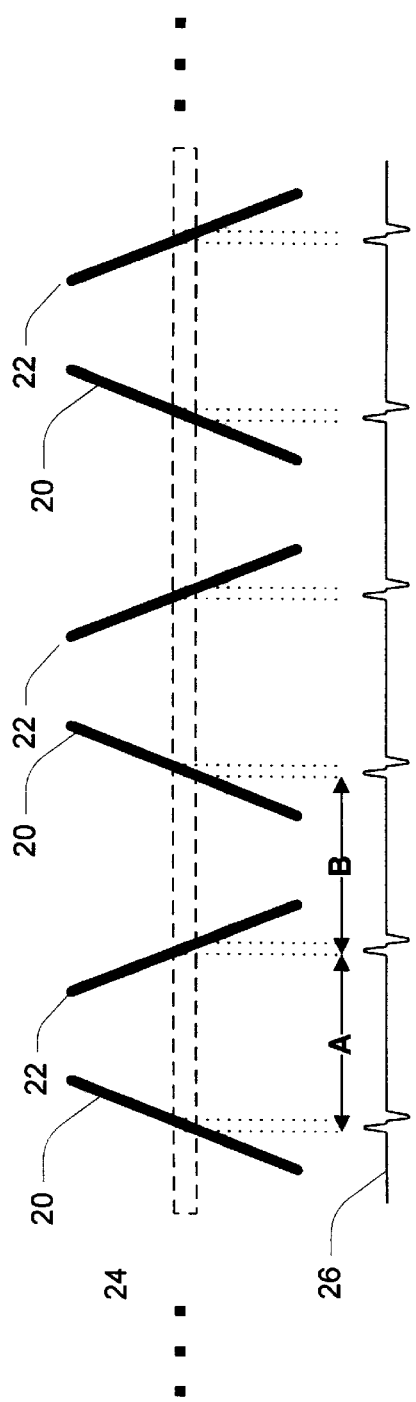
FIG. 2 illustrates a timing pattern utilized on the servo bands of the linear tape shown in FIG. 1, along with a trace of a read signal resulting from the timing pattern.
Figure 3:
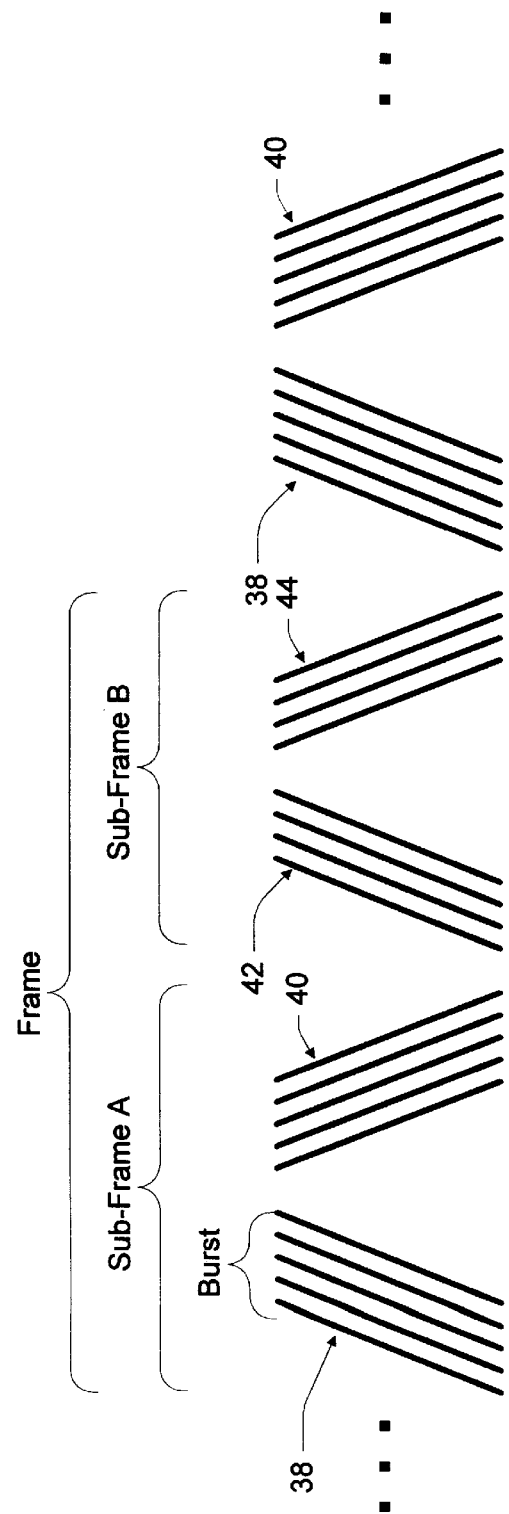
FIG. 3 illustrates a timing pattern similar to that of FIG. 2, using bursts of magnetic transitions or stripes.

As described in the Background with reference to FIGS. 1 and 2, the linear data storage tape in cartridge 52 has multiple servo bands extending longitudinally along the tape. A plurality of data tracks are positioned between respective pairs of servo bands. Each servo band contains a longitudinal pattern of repeating frames of magnetic transition stripes. The tape system 50 uses the stripes in the servo band for lateral position control of the tape head over the tape, as is described in the Background.

According to an aspect of this invention, the linear speed calculating unit 58 also uses the stripes in the servo band to derive a linear speed of the tape. The stripes act as synchronization marks that can be clocked for an accurate speed computation. In this manner, the magnetic transition stripes serve dual roles of lateral position control and linear speed derivation. However, the manufacturer may alternatively elect to place dedicated stripes in the servo band that are used exclusively as synchronization marks.

In general, velocity is equal to the distance traveled divided by the time required to travel the distance. The linear speed calculating unit 58 computes linear tape velocity by measuring the time elapsed between consecutive synchronization stripes in the servo band (as sensed by the tape head), and dividing the distance between the stripes (which is known beforehand) by the measured time. This approach provides a fairly accurate linear tape speed. However, the measurement may be affected if the tape head is moving laterally over the tape. The general velocity computation may not account for any error induced by this lateral speed component.

Figure 5:
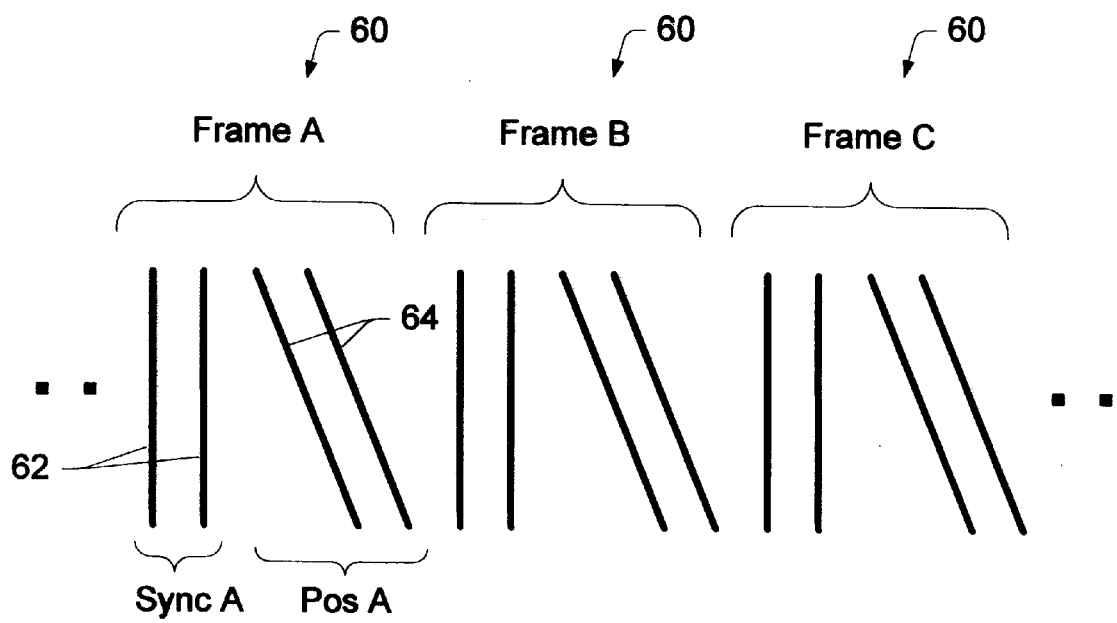
FIG. 5 illustrates individual frames in a servo band pattern having a first striping configuration.
Figure 6:
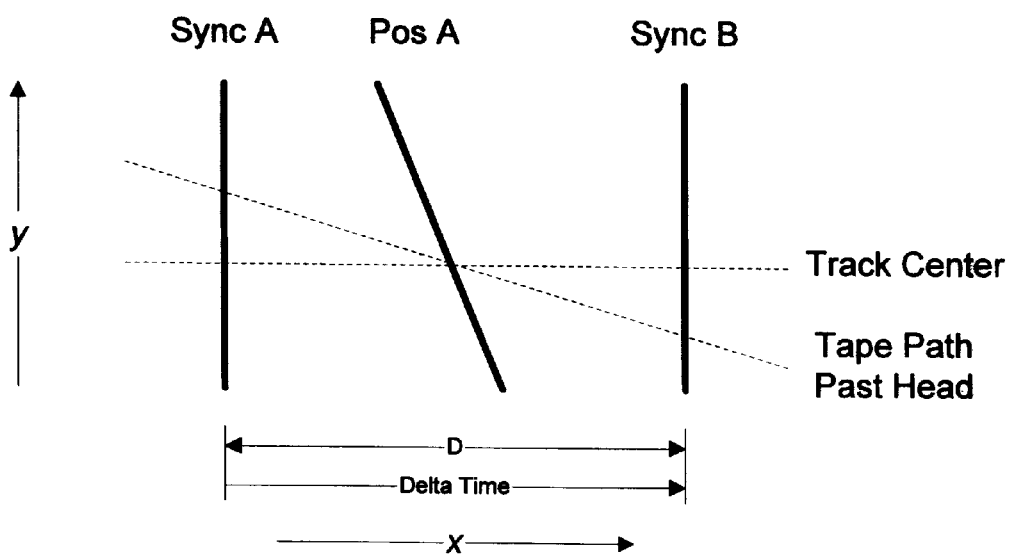
FIG. 6 illustrates a technique for determining linear speed from the servo band pattern of FIG. 5.
Figure 7:
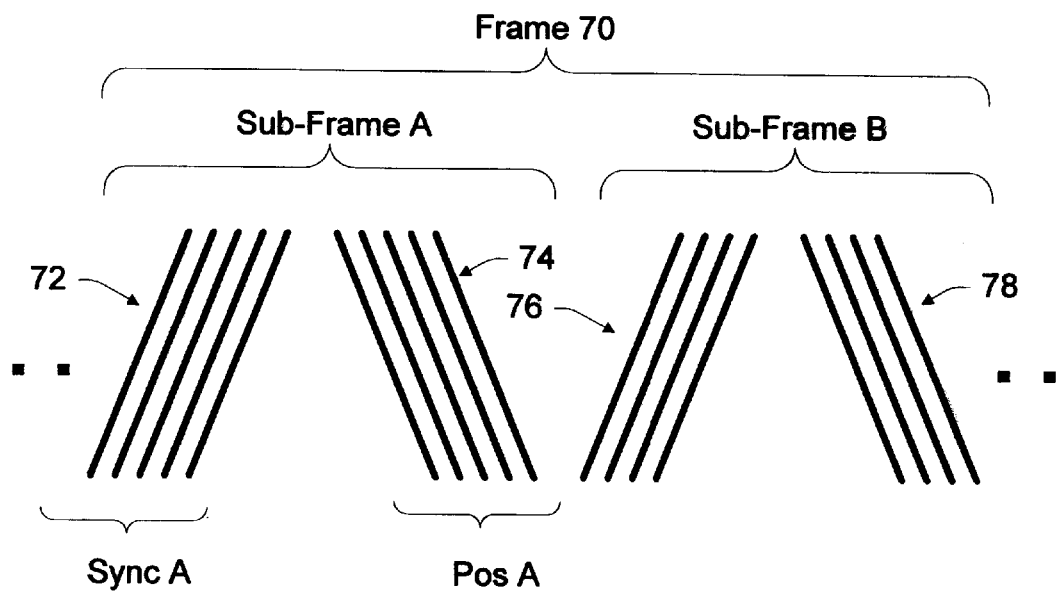
FIG. 7 illustrates individual frames in a servo band pattern having a second striping configuration.
Figure 8:
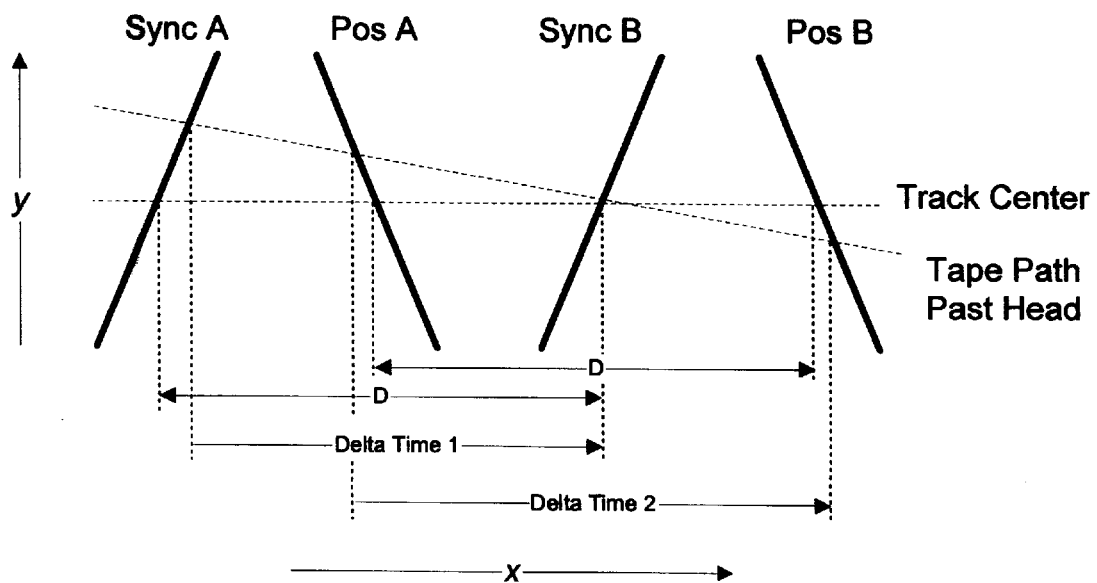
FIG. 8 illustrates a technique for determining linear speed from the servo band pattern of FIG. 7.

Accordingly, another aspect of this invention is to ensure that the linear tape speed derived by the speed calculating unit 58 is independent of lateral tape head movement and/or position. There are two different implementations described below. The first implementation involves a servo band striping pattern having at least some zero-azimuth stripes that are used as sync marks. FIGS. 5 and 6 illustrate this first implementation. The second implementation involves a servo band striping pattern having all nonzero-azimuth stripes and a new technique computing linear speed from the angled stripes. FIGS. 7 and 8 illustrate this second implementation.

FIG. 5 shows three consecutive frames 60—labeled individually as A, B, and C—from a servo band pattern for controlling lateral position of the tape head above the tape. Each frame 60 contains a burst of vertical stripes of zero azimuth, referenced generally by number 62, followed by a burst of angled stripes of non-zero azimuth (e.g., negative ten degree slope), referenced generally by number 64. Each zero-azimuth burst 62 within a frame contains two stripes. Additionally, each nonzero-azimuth burst 64 contains two angled stripes. It is noted, however, that the repeating frames 60 can have other striping configurations, such as the striping configuration described below with reference to FIGS. 7 and 8.

The lateral zero-azimuth stripes 62 are used for both lateral position control and as synchronization marks for determining linear tape speed. The linear speed calculating unit 58 in tape system 50 measures the time elapsed between sensing like positioned zero-azimuth stripes in consecutive frames (e.g., the first vertical stripes in frames A and B). The unit 58 then determines the linear speed of the tape by dividing the distance between the stripes (which is known beforehand) by the measured time.

To better illustrate this computation, FIG. 6 shows a first sync stripe from frame A, which is labeled as "sync A", and a corresponding second sync stripe from frame B, which is labeled as "sync B". The sync A and sync B stripes are spaced apart a distance D. An angled position stripe from frame A, which is labeled as "pos A", is shown intermediate of the sync A and B stripes.

Suppose the tape runs in the longitudinal direction x along a dashed path labeled "Track Center" and the tape head is moving laterally across the tape in the -y direction as indicated by the dashed path labeled "Tape Path Past Head". The tape path is illustrated as a negatively sloping line intersecting the track center at the pos A stripe.

As the tape moves underneath, the tape head detects the sync A and sync B stripes. The linear speed calculating unit 58 measures the time elapsed between sensing these stripes. This time is noted in FIG. 6 as "Δt".

The linear speed calculating unit 58 computes the linear velocity of the tape as follows:

linear velocity=D/Δt

With this striping configuration, the nonzero-azimuth synchronization stripes A and B are perpendicular to the track center. Even as the tape head moves laterally across the track, the sync stripes A and B remain perpendicular to the track center. As a result, the lateral movement of the tape head across the tape has no impact on the linear speed calculation. Thus, this implementation provides a linear speed calculation that is independent of lateral tape head position and movement.

FIG. 7 shows a second implementation of a servo band striping pattern and associated method for computing linear speed independent of the tape head's lateral position. FIG. 7 shows one frame 70 having a servo band pattern with all nonzero-azimuth stripes. The frame has a first subframe A and a second subframe B. Each subframe has a pair of bursts, with the bursts of each frame having different azimuthal slopes. Subframe A has a first burst 72 with five equally-spaced stripes having positive nonzero-azimuth slopes (e.g., +6°) and a second burst 74 with five equally-spaced stripes having negative nonzero-azimuth slopes (e.g., −6°). For purposes of this discussion, the first burst 72 can be considered the sync marks for subframe A and the second burst 74 can be considered the position marks for subframe A. Subframe B has similar bursts 76 and 78, except each of these bursts has only four stripes rather than five.

The servo band pattern in FIG. 7 is used for both lateral position control and for computation of linear tape speed. Unlike the servo band pattern in FIG. 5, however, the FIG. 7 servo band pattern does not have zero-azimuth sync stripes that run perpendicular to the track center. Instead, all of the stripes are angled relative to the track center. Accordingly, the linear speed calculating unit 58 cannot simply measure the change in time between two corresponding zero-azimuth sync stripes, as is the case in the first implementation.

FIG. 8 shows an alternative method for computing linear tape speed. The method uses four corresponding stripes from the same frame, including two corresponding sync marks "sync A" and "sync B" from subframes A and B, and two corresponding position marks "pos A" and "pos B" from subframes A and B. The center-to-center spacing between the sync A and sync B marks and the center-to-center spacing between the pos A and pos B marks is the same distance D.

The track center is illustrated at the mid-point of the stripes. The path of the tape past the tape head is illustrated as a negatively sloping line intersecting the track center.

As the tape passes underneath, the tape head detects, in order, the sync A, pos A, sync B, and pos B stripes. The linear speed calculating unit 58 measures a first time elapsed "Δt," between sensing the sync A and sync B stripes and a second time elapsed "$\Delta t_2$" between sensing the pos A and pos B stripes. The linear speed calculating unit 58 averages the two time measurements to obtain an averaged time measurement "$\Delta t_{avg}$", as follows:

$\Delta t_{avg} = (\Delta t_1 + \Delta t_2)/2$

The averaged time measurement accounts for any lateral tape head movement across the angled sync and position marks. If the tape head is moving laterally downward, as illustrated in FIG. 8, the Δt, time measured between the sync A and sync B marks is smaller than a theoretical correct time. On the other hand, the $\Delta t_2$ time measured between the pos A and pos B marks is longer than the theoretical correct time by an equal amount that the first time measurement is deficient. As a result, averaging the two time measurements effectively cancels the extra time in the $\Delta t_2$ measurement with the time deficiency in the $\Delta t_1$ measurement.

The linear speed calculating unit 58 then computes the linear velocity of the tape as follows:

linear velocity=D/$\Delta t_{avg}$

With this method, the lateral movement of the tape head across the tape has no impact on the linear speed calculation. Thus, this implementation provides a linear speed calculation that is independent of lateral tape head position and movement.

The invention has been described in language specific to structural features and/or methodological steps. It is to be understood, however, that the invention defined in the appended claims is not necessarily limited to the specific features or steps described above. Rather, the specific features and steps are disclosed as exemplary forms of implementing the claimed invention.

What is claimed is:

1. A method for operating a linear data storage tape, the data storage tape having one or more servo bands extending longitudinally along the tape, each servo band having a longitudinal pattern of magnetic transition stripes, wherein said each servo band has a longitudinal pattern of repeating frames of the magnetic transition stripes, each frame comprising a set of one or more zero-azimuth stripes followed by a set of one or more nonzero-azimuth stripes, the method comprising the following steps:

detecting the magnetic transition stripes as the data storage tape is moved in the longitudinal direction for use in lateral position control of a tape head above the data storage tape; and using the magnetic transition stripes also as synchronization marks to determine a linear tape speed of the data storage tape.

2. A method as recited in claim 1, further comprising the step of computing the linear tape speed based on a time elapsed between two zero-azimuth stripes in consecutive frames.

3. A method for operating a linear data storage tape, the data storage tape having one or more servo bands extending longitudinally along the tape, each servo band having a longitudinal pattern of magnetic transition stripes, wherein said each servo band has a longitudinal pattern of repeating frames of the magnetic transition stripes, each frame comprising a first burst of one or more nonzero-azimuth stripes of positive azimuthal slope, followed by a second burst of one or more nonzero-azimuth stripes of negative azimuthal slope, followed by a third burst of one or more nonzero-azimuth stripes of positive azimuthal slope, followed by a fourth burst of one or more nonzero-azimuth stripes of negative azimuthal slope, the method comprising the following steps:

detecting the magnetic transition stripes as the data storage tape is moved in the longitudinal direction for use in lateral position control of a tape head above the data storage tape; and using the magnetic transition stripes also as synchronization marks to determine a linear tape speed of the data storage tape.

4. A method as recited in claim 3 further comprising the step of computing the linear tape speed based on an average of a first time elapsed between sensing two positively sloped nonzero-azimuth stripes, one from the first burst and one from the third burst, and a second time elapsed between sensing two negatively sloped nonzero-azimuth stripes, one from the second burst and one from the fourth burst.

5. A method for determining a linear speed of a linear data storage tape as the data storage tape moves past a tape head, the linear data storage tape having at least one servo band written thereon, the servo band having a longitudinal pattern of repeating frames of the magnetic transition stripes, each frame comprising a first burst of one or more nonzero-azimuth stripes of positive azimuthal slope, followed by a second burst of one or more nonzero-azimuth stripes of negative azimuthal slope, followed by a third burst of one or more nonzero-azimuth stripes of positive azimuthal slope, followed by a fourth burst of one or more nonzero-azimuth stripes of negative azimuthal slope, the method comprising the following steps:

measuring a first time elapsed between detecting two positively sloped nonzero-azimuth stripes, one from the first burst and one from the third burst;

measuring a second time elapsed between detecting two negatively sloped nonzero-azimuth stripes, one from the second burst and one from the fourth burst;

averaging the first and second times to produce an averaged time; and dividing a center-to-center distance between the two positively sloped nonzero-azimuth stripes or the two negatively sloped nonzero-azimuth stripes by the averaged time to yield a linear speed of the linear data storage tape that is independent of lateral position of the tape head relative to the data storage tape.

6. In a linear data storage tape system having a tape head for reading and writing a linear data storage tape as the data storage tape moves in a longitudinal direction, the linear data storage tape having at least one servo band written thereon, the servo band having a longitudinal pattern of repeating frames of magnetic transition stripes that the tape head uses to control its lateral position relative to the data storage tape, a method for determining a linear speed of the linear data storage tape in the longitudinal direction comprising the steps of measuring timing data between selected pairs of the magnetic stripes and using the timing data to derive a linear speed that is independent of lateral position of the tape head.

7. A system for a linear data storage tape, the linear data storage tape having at least one servo band written thereon, the servo band having a longitudinal pattern of repeating frames of magnetic transition stripes, the system comprising:

a tape head to read and write the data storage tape, the tape head sensing the stripes in the servo band to control lateral position of the tape head relative to the data storage tape;

a linear speed calculating unit to derive timing data from the stripes sensed by the tape head and to compute a linear speed of the data storage tape that is independent of the lateral position of the tape head based on the timing data.

8. A system as recited in claim 7, wherein each frame has a set of one or more zero-azimuth stripes followed by a set of one or more nonzero-azimuth stripes, and the linear speed calculating unit computes the linear tape speed based on a time elapsed between two zero-azimuth stripes in consecutive frames.

9. A system as recited in claim 7, wherein each frame comprises a first burst of one or more nonzero-azimuth stripes of positive azimuthal slope, followed by a second burst of one or more nonzero-azimuth stripes of negative azimuthal slope, followed by a third burst of one or more nonzero-azimuth stripes of positive azimuthal slope, followed by a fourth burst of one or more nonzero-azimuth stripes of negative azimuthal slope, and the linear speed calculating unit computes the linear tape speed based on an average of a first time elapsed between sensing two positively sloped nonzero-azimuth stripes, one from the first burst and one from the third burst, and a second time elapsed between sensing two negatively sloped nonzero-azimuth stripes, one from the second burst and one from the fourth burst.

* * * * *